(12) United States Patent
Ahn et al.

(10) Patent No.: US 8,126,431 B2
(45) Date of Patent: Feb. 28, 2012

(54) APPARATUS AND METHOD FOR SETTING COMMUNICATION SERVICE BLOCKING MODE IN MOBILE TERMINAL

(75) Inventors: Seung-Kwon Ahn, Seoul (KR); Sung-Ho Woo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 839 days.

(21) Appl. No.: 12/163,520

(22) Filed: Jun. 27, 2008

(65) Prior Publication Data

US 2009/0280790 A1   Nov. 12, 2009

(30) Foreign Application Priority Data

May 8, 2008   (KR) ........................ 10-2008-0043062

(51) Int. Cl.
*H04M 3/16* (2006.01)

(52) U.S. Cl. .......................... 455/410; 455/418; 455/566
(58) Field of Classification Search ........................ None
See application file for complete search history.

(56) References Cited

U.S. PATENT DOCUMENTS 6,131,046 A * 10/2000 Sano et al. .................... 455/566
2005/0119031 A1   6/2005 Spalink et al.
(Continued)

FOREIGN PATENT DOCUMENTS

WO   2005/109155   11/2005

*Primary Examiner* — Erika Gary
(74) *Attorney, Agent, or Firm* — Lee, Hong, Degerman, Kang & Waimey

(57) ABSTRACT

An apparatus and method for setting a flight mode in a mobile terminal are provided in which menu items are displayed such that executable functions may be distinguished from non-executable functions.

18 Claims, 15 Drawing Sheets

U.S. PATENT DOCUMENTS

2005/0267650 A1* 12/2005 Carpenter et al. ............... 701/3
2006/0046704 A1* 3/2006 Hori et al. .................... 455/418
2009/0061781 A1* 3/2009 Zhang ......................... 455/66.1
2009/0280858 A1* 11/2009 Ahn et al. ................. 455/550.1

* cited by examiner

APPARATUS AND METHOD FOR SETTING COMMUNICATION SERVICE BLOCKING MODE IN MOBILE TERMINAL

CROSS-REFERENCE TO RELATED APPLICATIONS

This application is related to and claims priority under 35 U.S.C. §119(a) to Patent Application No. 10-2008-0043062 filed in Republic of Korea on May 8, 2008.

FIELD OF THE INVENTION

The present invention is directed to a mobile terminal and, specifically, to a communication service blocking mode in a mobile terminal that displays menu items such that executable functions may be distinguished from non-executable functions.

DESCRIPTION OF THE RELATED ART

In general, a mobile terminal is a device that can be carried and performs one or more functions, such as voice and video call communication, inputting and outputting information and storing data. Mobile terminals have been implemented as a multimedia player or device supporting more complicated functions in order to provide more diversified functions, such as capturing images or video, reproducing music or video files, playing games, and receiving broadcast signals.

Numerous improvements have been implemented in hardware or software in order to implement various functions of multimedia players. For example, a user interface allowing users to easily and conveniently search for and select one or more functions is provided.

However, mobile terminals have limited use in certain places where accurate electronic equipment is used, such as in airplanes, in order to prevent the malfunction of such electronic equipment due to transmission waves of the mobile terminal such as RF signals. Therefore, the user must turn the mobile terminal power off or switch the mode of the terminal to a communication blocking mode in which communication service is blocked when located in certain places, such as in an airplane. Furthermore, the user must turn the power of the mobile terminal on again after leaving an area, such as an airplane, that prohibits or limits use of the mobile terminal.

Prior art mobile terminals cannot receive incoming calls or messages if the user forgets to turn the mobile terminal power on or does not release the communication blocking mode.

SUMMARY OF THE INVENTION

In one aspect of the present invention, a method for displaying a menu screen in a mobile terminal is provided. The method includes restricting use of at least one specific mobile terminal function upon receiving a command to enter a restricted mode, displaying at least one icon, each of the at least one displayed icon corresponding to a function whose use is not restricted, receiving an input related to the selection of one of the at least one displayed icon and executing the function corresponding to the selected icon.

It is contemplated that the method further includes displaying a plurality of icons corresponding to functions whose use is not restricted, the plurality of icons displayed according to a determined previous rate of selection of the plurality of icons. It is further contemplated that the method further includes displaying a plurality of icons corresponding to functions whose use is not restricted, the plurality of icons displayed according to a predetermined order. Preferably, a user sets the predetermined order.

In another aspect of the present invention, a method for displaying a menu screen of a mobile terminal is provided. The method includes restricting use of at least one specific mobile terminal function and displaying at least a first icon corresponding to a function whose use is restricted and at least a second icon corresponding to a function whose use is not restricted, wherein the at least a first icon and the at least a second icon are displayed using at least one distinguishing feature such that the function whose use is restricted is visually distinguishable from the function whose use is not restricted.

It is contemplated that the method further includes detecting a current location of the mobile terminal, determining that the current location corresponds to a specific area where the at least one specific function should be restricted and entering a preliminary restricted mode and displaying a mode restriction indicator without entering a restricted mode in which use of the at least one specific function is restricted, the restriction indicator indicating that the mobile terminal has entered the specific area. It is further contemplated that the method further includes entering the restricted mode and restricting use of the at least one specific function upon receiving a specific command to enter the restricted mode.

It is contemplated that the at least one distinguishing feature includes a different font, a different size or a different color. It is further contemplated that the at least one distinguishing feature includes displaying the at least a first icon as a blank space. Preferably, the at least one distinguishing feature includes displaying the at least a first icon with a canceling line.

In another aspect of the present invention, a mobile terminal configured to display a menu screen is provided. The mobile terminal includes an input unit configured to receive commands, a display configured to display information and a controller configured to restrict use of at least one specific mobile terminal function and control the display to display at least one icon upon receiving a command via the input unit to enter a restricted mode, and to execute a function corresponding to one of the at least one displayed icon upon receiving an input via the input unit to select the one of the at least one displayed icon, wherein each of the at least one displayed icon corresponds to a function whose use is not restricted.

It is contemplated that the controller is further configured to control the display unit to display a plurality of icons corresponding to functions whose use is not restricted, the plurality of icons displayed according to a determined previous rate of selection of the plurality of icons. It is further contemplated that the controller is further configured to control the display unit to display a plurality of icons corresponding to functions whose use is not restricted, the plurality of icons displayed according to a predetermined order. Preferably, a user sets the predetermined order.

In another aspect of the present invention, a mobile terminal configured to display a menu screen is provided. The mobile terminal includes an input unit configured to receive commands, a display configured to display information and a controller configured to restrict use of at least one specific mobile terminal function and control the display to display at least a first icon corresponding to a function whose use is restricted and at least a second icon corresponding to a function whose use is not restricted upon receiving a specific command via the input unit to enter a restricted mode, wherein the at least a first icon and the at least a second icon are displayed using at least one distinguishing feature such that the function whose use is restricted is visually distinguishable from the function whose use is not restricted.

It is contemplated that the controller is configured to a location detector configured to detect a current location of the mobile terminal and wherein the controller is further configured to determine that the current location corresponds to a specific area where the at least one specific function should be restricted and enter a preliminary restricted mode and display a mode restriction indicator without entering the restricted mode, the restriction indicator indicating that the mobile terminal has entered the specific area. It is further contemplated that the controller is further configured to enter the restricted mode and restrict use of the at least one specific function upon receiving the specific command.

It is contemplated that the at least one distinguishing feature includes a different font, a different size or a different color. It is further contemplated that the at least one distinguishing feature includes displaying the at least a first icon as a blank space. Preferably, the at least one distinguishing feature includes displaying the at least a first icon with a canceling line.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
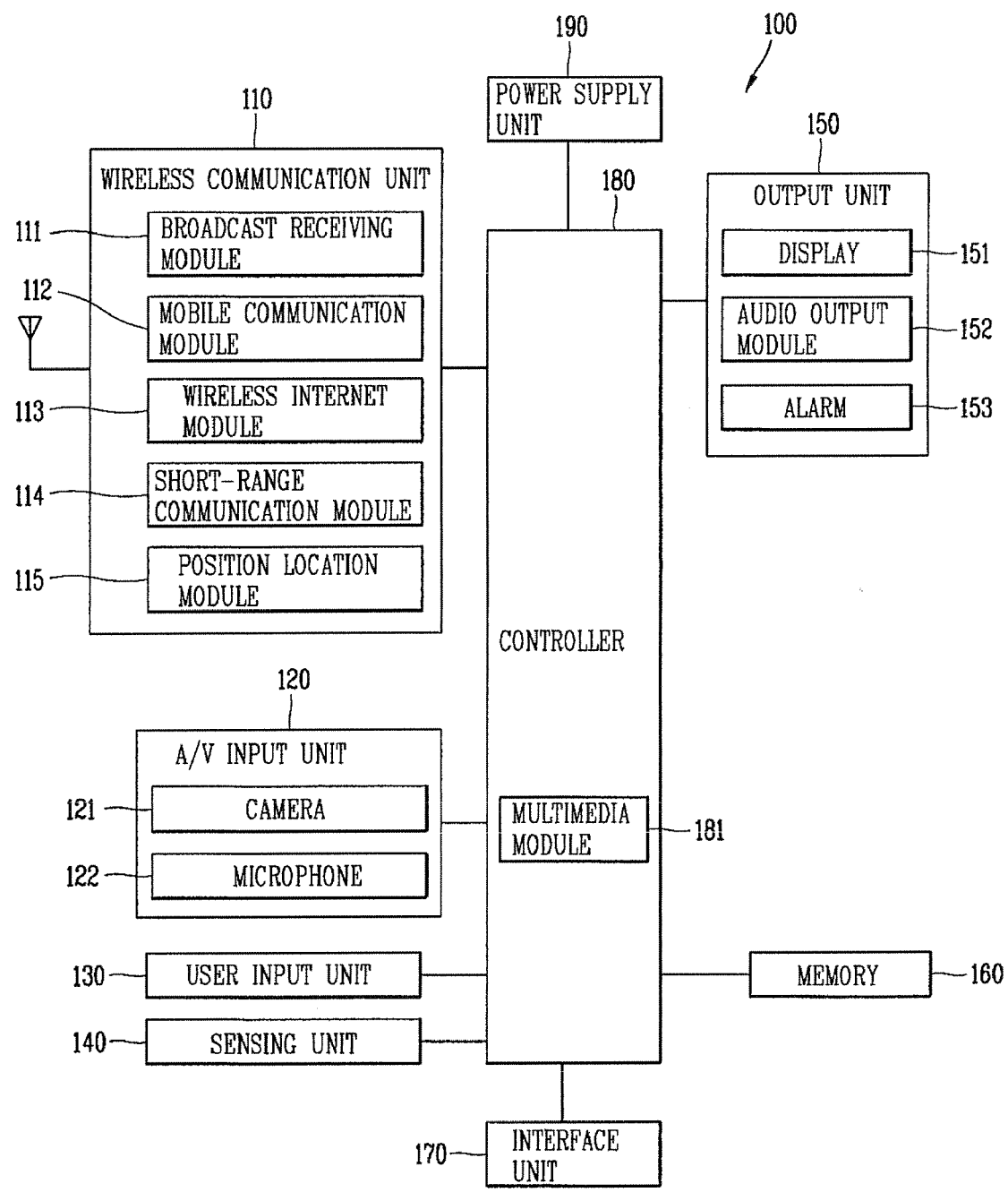
FIG. 1 is a block diagram illustrating a mobile terminal according to one embodiment of the present invention.

A preferred embodiment of a mobile terminal according to the present invention will be described with reference to FIGS. 1-3. FIG. 1 is a block diagram of mobile terminal 100 in accordance with an embodiment of the present invention.

The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components that permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel.

The broadcast managing entity refers generally to a system that transmits a broadcast signal and/or broadcast associated information. Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T).

Receiving multicast signals is also possible. Data received by the broadcast receiving module 111 may be stored in a suitable device, such as the memory 160.

The mobile communication module 112 communicates wireless signals with one or more network entities, such as base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100.

The short-range communication module 114 facilitates relatively short-range communications. Suitable technologies for short-range communication may include, but are not limited to, radio frequency identification (RFID), infrared data association (IrDA), ultra-wideband (UWB), as well at the networking technologies commonly referred to as Bluetooth® and ZigBee®.

The position-location module 115 identifies or otherwise obtains the location of the mobile terminal 100. The position-location module 115 may be implemented using global positioning system (GPS) components that cooperate with associated satellites, network components, and combinations thereof.

The audio/video (A/V) input unit 120 provides audio or video signal input to the mobile terminal 100. As shown, the A/V input unit 120 includes a camera 121 and a microphone 122.

The camera 121 receives and processes image frames of still pictures or video. The microphone 122 receives an external audio signal while the mobile terminal 100 is in a particular mode, such as phone call mode, recording mode and voice recognition. This audio signal is processed and converted into digital data.

The mobile terminal 100, and specifically the A/V input unit 120, may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110. Two or more microphones 122 and/or cameras 121 may be used.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a touch screen display, which will be described in more detail later.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, orientation or acceleration/deceleration of the mobile terminal.

The mobile terminal 100 may be a slide-type mobile terminal and the sensing unit 140 may sense whether a sliding portion of the mobile terminal is open or closed. The sensing unit 140 may also sense the presence or absence of power provided by the power supply 190, the presence or absence of a coupling or other connection between the interface unit 170 and an external device.

The interface unit 170 may couple the mobile terminal 100 with external devices. Typical external devices include wired/wireless headphones, external chargers, power supplies, storage devices configured to store data such as audio, video, and pictures, earphones, and microphones. The interface unit 170 may be configured using a wired/wireless data port, audio input/output ports, video input/output ports, or a card socket for coupling to a memory card, subscriber identity module (SIM) card, user identity module (UIM) card, or a removable user identity module (RUIM) card.

The output unit 150 may include various components that support the output requirements of the mobile terminal 100. It is understood that the various signals provided by the components of output unit 150 may be separately performed, or performed using any combination of such components.

The display 151 may be implemented to visually display information associated with the mobile terminal 100. For example, the display 151 may provide a user interface or graphical user interface that includes information associated with placing, conducting, and terminating a phone call if the mobile terminal 100 is operating in a phone call mode. As another example, the display 151 may additionally or alternatively display images that are associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode.

The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving a user input in order to provide a tactile feedback mechanism.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage devices.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination of software and hardware.

The embodiments described may be implemented in a hardware implementation within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination of the components. The controller 180 may also implement such embodiments.

The embodiments described herein may be implemented in a software implementation with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of mobile terminal configurations include folder-type, slide-type, bar-type, rotational-type, swing-type and combinations thereof.

For clarity, further disclosure will primarily relate to a slide-type mobile terminal 100. However, such teachings apply equally to other types of mobile terminals 100.

Figure 2:
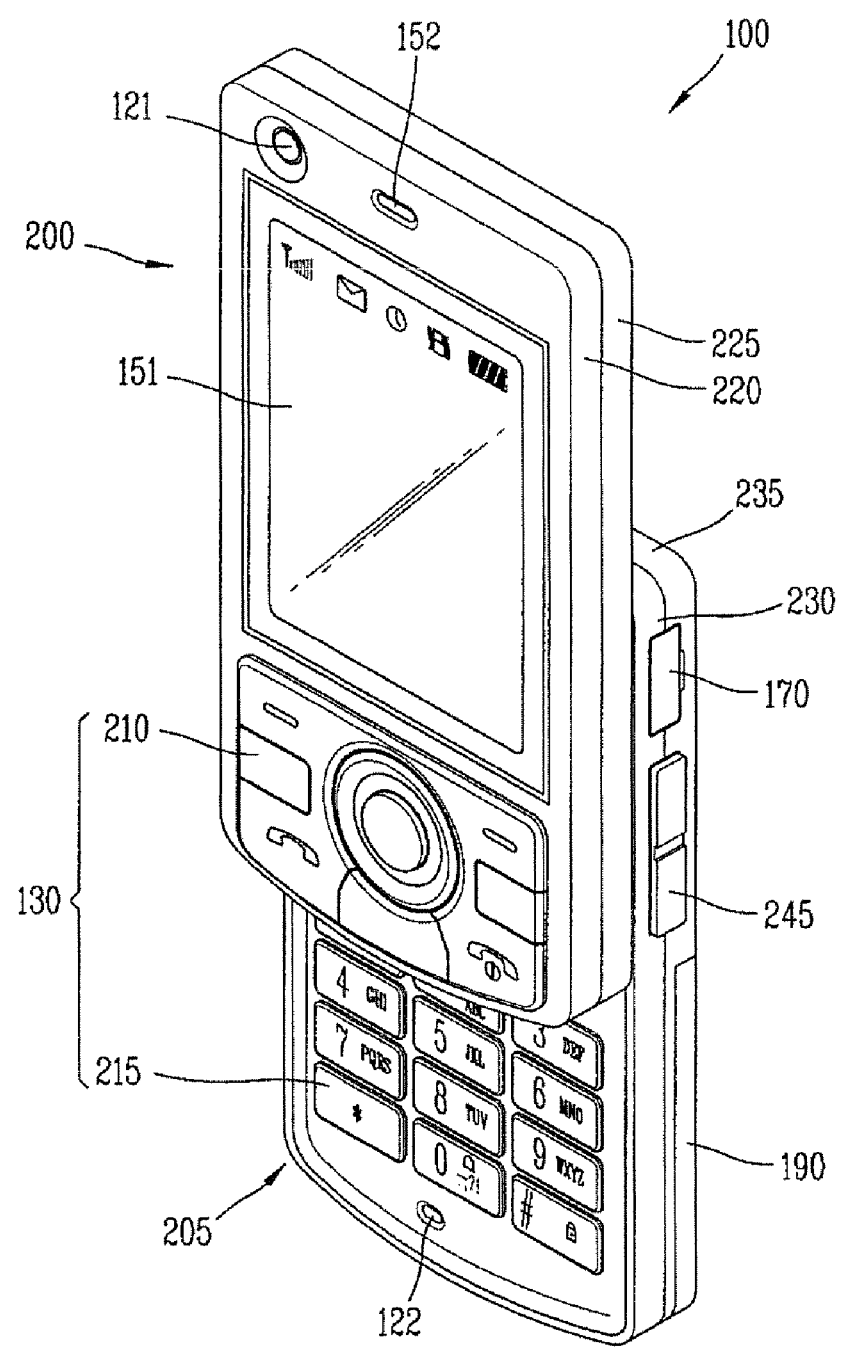
FIG. 2 is a perspective view of a front side of a mobile terminal according to one embodiment of the present invention.

FIG. 2 is a perspective view of a front side of a mobile terminal 100 according to an embodiment of the present invention. The mobile terminal 100 is illustrated in FIG. 2 having a first body 200 configured to slidably cooperate with a second body 205.

The user input unit 130 illustrated in FIG. 1 is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as 'start', 'stop' and 'scroll'.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is illustrated as formed of a first case 220 and a second case 225. The second body 205 is illustrated as formed of a first case 230 and a second case 235. The front case 220 and second case 225 of the first body 200 and the first case 230 and second case 235 or the second body 205 are generally formed of a suitably rigid material, such as injection molded plastic, or formed using metallic material, such as stainless steel (STS) and titanium (Ti).

One or more intermediate cases may be provided between the first case 220 and second case 225 of the first body 200 or between the first case 230 and second case 235 of the second body 205. The first body 200 and second body 205 are typically sized to receive electronic components necessary to support operation of the mobile terminal 100.

The first body 200 is illustrated as having a camera 121 and audio output module 152 configured as a speaker and positioned relative to the display 151. The camera 121 may be constructed such that it can be selectively positioned relative to first body 200 by rotation or swiveling.

The function keys 210 are positioned adjacent to a lower side of the display 151, which is illustrated as an LCD or OLED. The display 151 may also be configured as a touch screen having an underlying touchpad that generates signals responsive to user contact with the touch screen, such as with a finger or stylus.

The second body 205 is illustrated as having a microphone 122 positioned adjacent to the keypad 215 and having side keys 245, which are one type of user input unit, positioned along the side of second body. Preferably, the side keys 245 are configured as hot keys such that the side keys are associated with a particular function of the mobile terminal 100.

An interface unit 170 is illustrated as positioned adjacent to the side keys 245. A power supply 190 in a form of a battery is illustrated as located on a lower portion of the second body 205.

Figure 3:
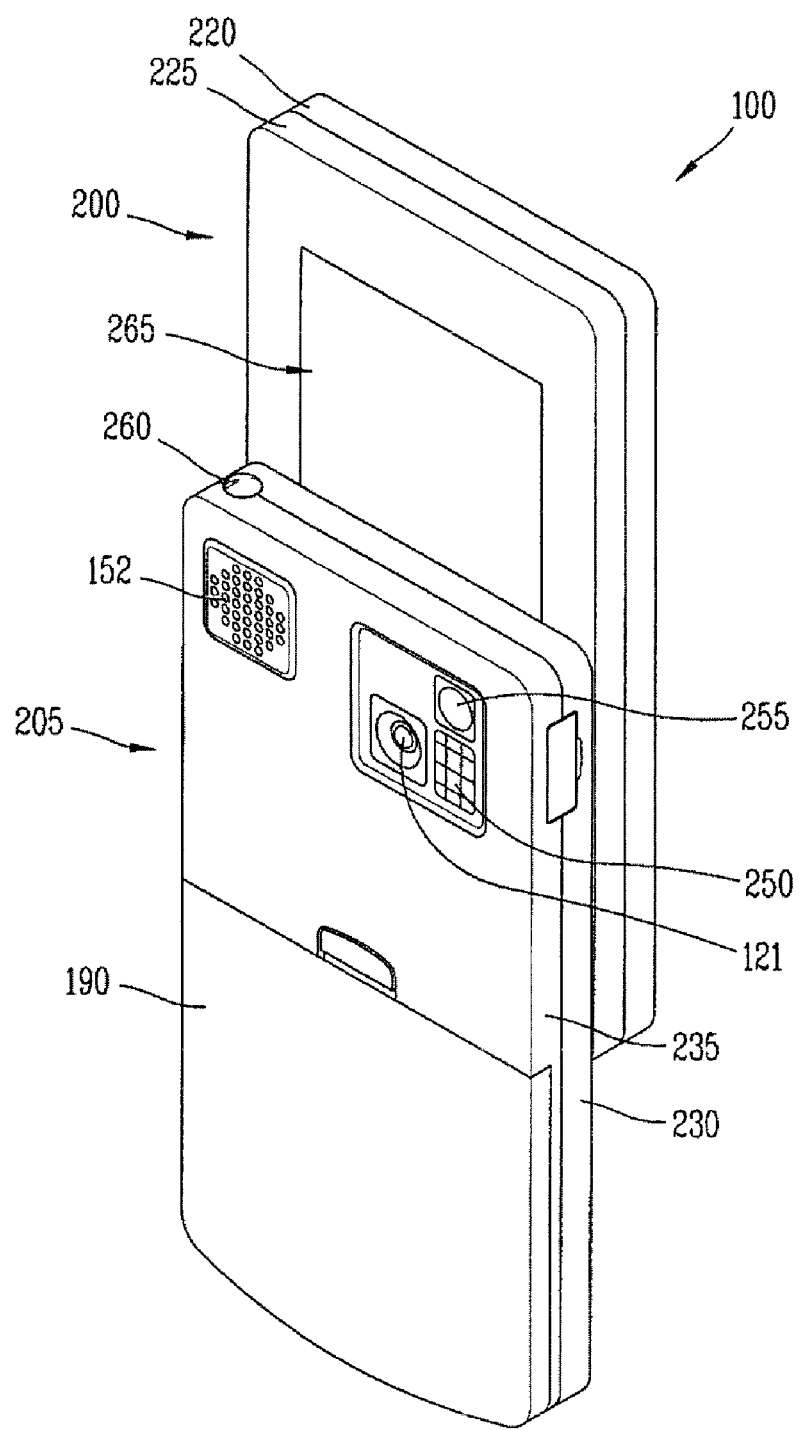
FIG. 3 is a rear view of the mobile terminal illustrated in FIG. 2.

FIG. 3 is a rear view of the mobile terminal illustrated in FIG. 2. FIG. 3 illustrates the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a videoconference, for example, in which reverse link bandwidth capabilities may be limited. The relatively higher resolution of the camera 121 of the second body 205 is useful for obtaining higher quality pictures for later use or for communicating with other parties.

The second body 205 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is illustrated as located at an upper end of the second body 205. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module (not shown) located on the front side of the second body 205.

It is understood that the arrangement of the various components of the first body 200 and second body 205 illustrated in FIGS. 2 and 3 may be modified as required or desired. For example, some or all of the components of one body may alternatively be implemented on the other body. Furthermore, the location and relative positioning of the components are not critical and, therefore, the components may be positioned at locations that differ from those illustrated in FIGS. 2 and 3.

The mobile terminal 100 illustrated in FIGS. 1-3 may be configured to operate within a communication system which transmits data via frames or packets, including both wireless and wired communication systems and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long-term evolution (LTE) of the UMTS, and the global system for mobile communications (GSM). By way of non-limiting example only, further description will relate to a CDMA communication system, but such teachings apply equally to other system types.

Figure 4:
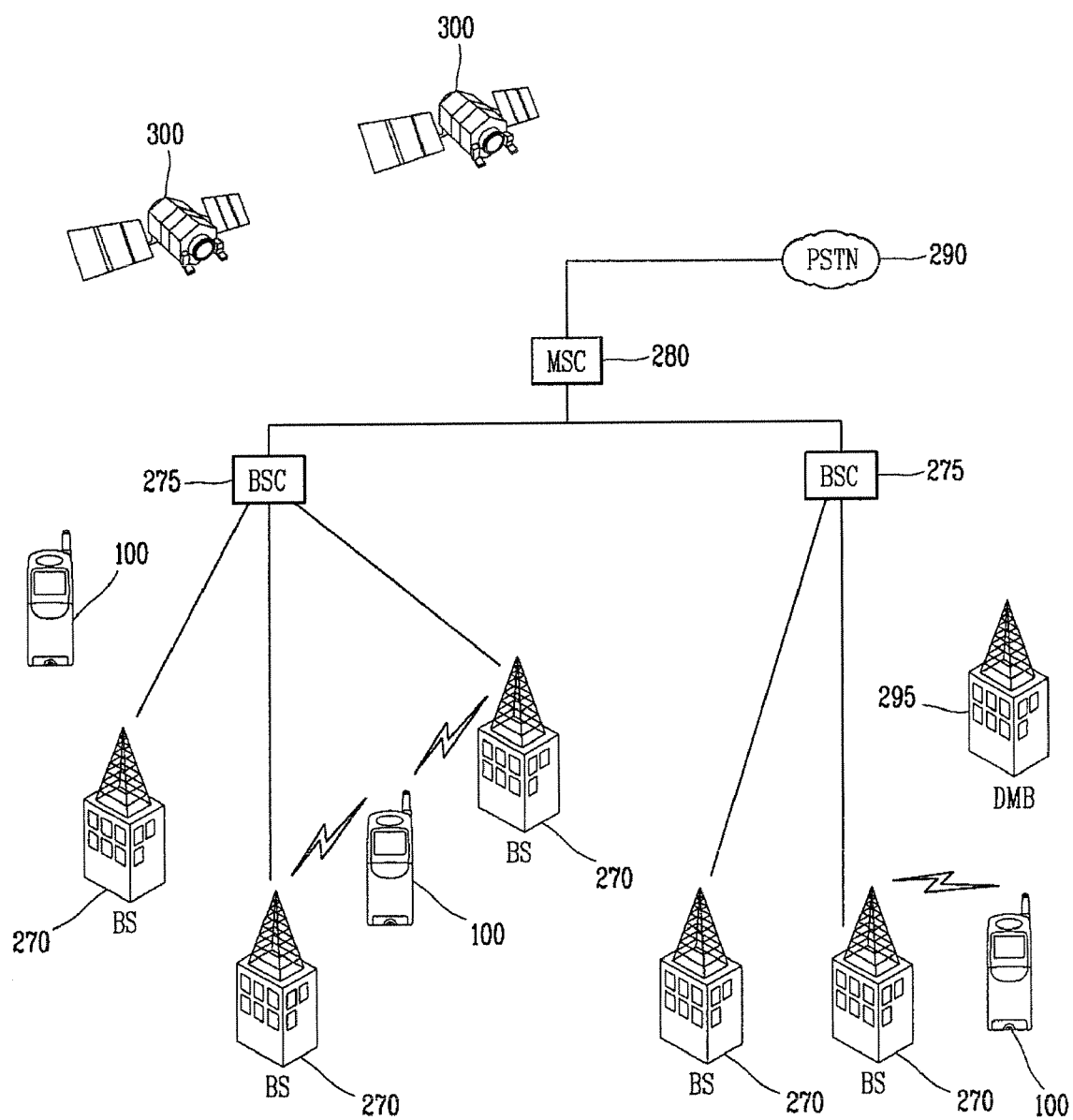
FIG. 4 is a block diagram illustrating a wireless communication system operable with the mobile terminal according to the present invention.

FIG. 4 illustrates a CDMA wireless communication system. The CDMA wireless communication system has a plurality of mobile terminals 100, a plurality of base stations (BS) 270, a plurality of base station controllers (BSC) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including E1/T1, ATM, IP, PPP, Frame Relay, HDSL, ADSL, or xDSL. The system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments each having a particular spectrum, such as 1.25 MHz or 5 MHz.

The intersection of a sector and frequency assignment may be referred to as a CDMA channel. The BSs 270 may also be referred to as base station transceiver subsystems (BTSs).

The term "base station" may be used to refer collectively to a BSC 275 and one or more BSs 270. The BSs 270 may also be denoted as "cell sites." Alternatively, individual sectors of a given BS 270 may be referred to as "cell sites."

A terrestrial digital multimedia broadcasting (DMB) transmitter (BT) 295 is illustrated as broadcasting to the mobile terminals 100 operating within the system. The broadcast receiving module 111 illustrated in FIG. 1 may be configured to receive broadcast signals transmitted by the BT 295. Similar arrangements may be implemented for other types of broadcast and multicast signaling as discussed above.

FIG. 4 further illustrates several global positioning system (GPS) satellites 300 that facilitate locating the position of some or all of the mobile terminals 100. Two satellites 300 are illustrated, but it is understood that useful positioning information may be obtained with greater or fewer satellites.

The position-location module 115 illustrated in FIG. 1 may be configured to cooperate with the satellites 300 to obtain desired position information. Other types of position detection technology may alternatively be implemented, such as location technology that may be used in addition to or instead of GPS location technology. Some or all of the GPS satellites 300 may be alternatively or additionally configured to provide satellite DMB transmissions.

The BSs 270 receive sets of reverse-link signals from various mobile terminals 100 during typical operation of the wireless communication system. The mobile terminals 100 perform calls, messaging, and other communications.

Each reverse-link signal received by a given BS 270 is processed within that BS. The resulting data is forwarded to an associated BSC 275.

The BSC 275 provides call resource allocation and mobility management functionality including soft handoffs between the BSs 270. The BSCs 275 also route the received data to the MSC 280, which provides additional routing services for interfacing with the PSTN 290.

Similarly, the PSTN 290 interfaces with the MSC 280, which interfaces with the BSCs 275. The BSCs 275 control the BSs 270 to transmit sets of forward-link signals to the mobile terminals 100.

The preferred embodiments of the present invention will be described with reference to the accompanying drawings. The embodiments of the present invention will be described according to three functions for the sake of explanation, specifically the setup of flight mode, the user interface in flight mode and the release of flight mode.

A flight mode or communication service blocking mode refers to a function of restricting or blocking communications of a mobile terminal 100 in order to prohibit the use of the mobile terminal for placing a call, receiving/sending messages and using additional communication service functions even when the mobile terminal is powered on. Other functions may still be used, such as searching for a phone number, playing a game, receiving a broadcast, activating MP3 players, and using a camera.

Figure 5:
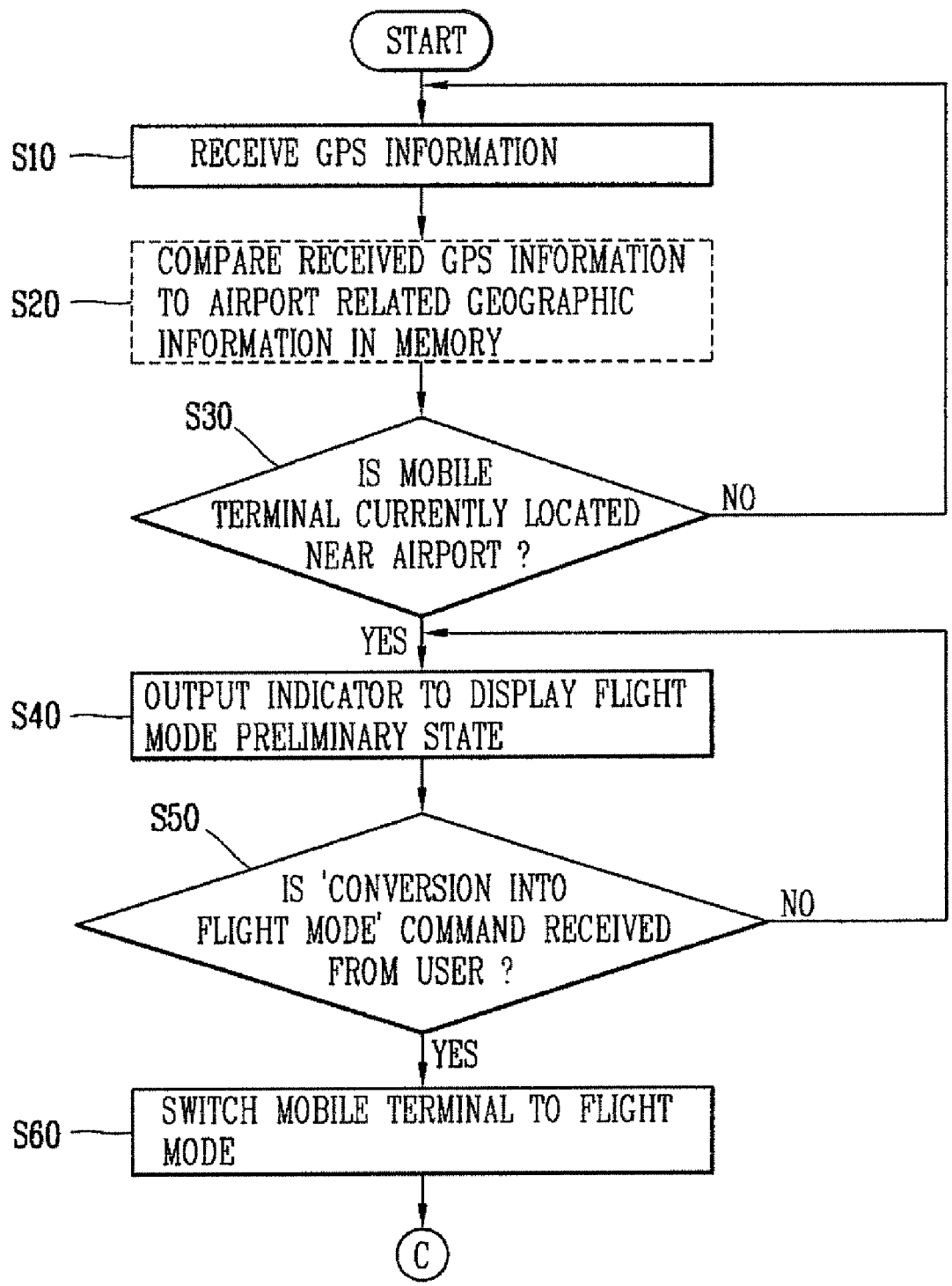
FIG. 5 is a flowchart illustrating a method for setting a flight mode in a mobile terminal according to the present invention.

FIG. 5 illustrates a method for setting a flight mode in a mobile terminal 100 according to the present invention. A mobile terminal 100 according to the present invention has stored geographic information related to an airport as conditions for switching to a flight mode, hereinafter referred to as 'Condition A'. The geographic information related to the airport may either be input by a user or input during the manufacturing process of the mobile terminal 100.

The mobile terminal 100 receives location information indicating that the mobile terminal is located near an airport, which is another condition for switching to the flight mode hereinafter referred to as 'Condition B'. The location information may be transmitted by any device that can provide location information related to a mobile terminal 100, such as a Bluetooth® device, a Radio Frequency Identification (RFID) device, an Infrared Data Association (IrDA) device, an Ultra WideBand (UWB) device, a ZigBee® device, a Global Positioning System (GPS), or a base station.

The location information or a command to set a flight mode may be received by the mobile terminal 100 upon approaching or entering a specific location or coming into contact with a device that sends the corresponding information such that the mobile terminal can be switched to the flight mode based only upon the received information corresponding to 'Condition B'. Specifically, a signal with a short signal transfer distance of devices, such Bluetooth®, RFID, IrDA communication or ZigBee® may not be used to transmit location information indirectly prompting the mobile terminal 100 to switch to the flight mode, but rather be used as a transfer unit of the setup command for the flight mode that directly prompts the mobile terminal to switch to the flight mode, as illustrated in FIG. 6.

Figure 6:
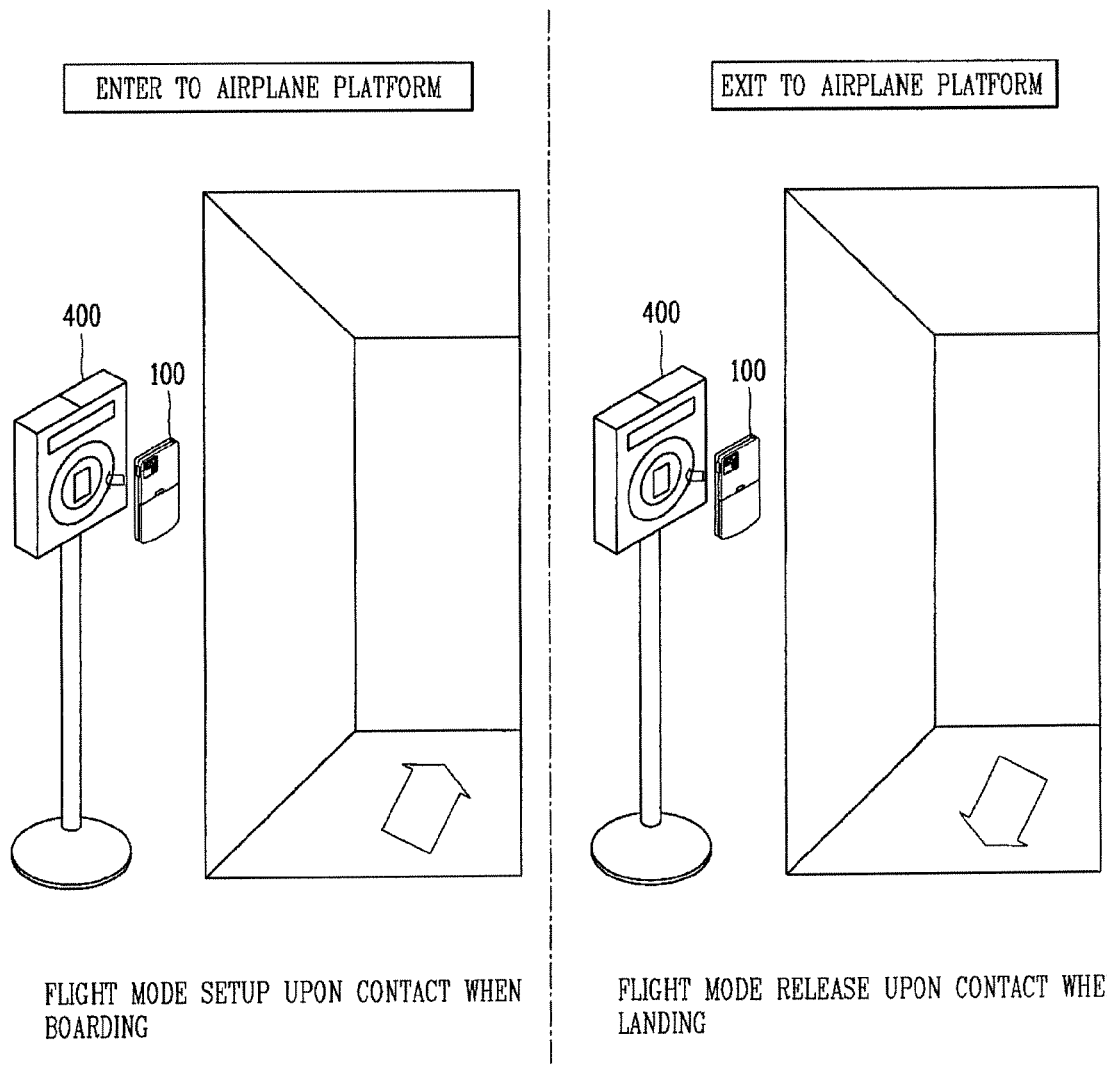
FIG. 6 illustrates setting and releasing a flight mode using a Bluetooth® signal, an IrDA communication signal, or a ZigBee® signal.

FIG. 6 illustrates one embodiment of the present invention in which a flight mode is set before boarding an airplane and released after landing using a Bluetooth® signal, an IrDA communication signal, or ZigBee® signal. As illustrated in FIG. 6, a user contacts or approaches a signal generating device 400 with his mobile terminal 100 before boarding an airplane and the controller 180 receives a flight mode setup command from the signal generating device via the wireless communication unit 110 in order to switch the mobile terminal to the flight mode. The controller 180 receives a flight mode release command from the signal generating device 400 when the user re-contacts his mobile terminal 100 to the signal generating device upon exiting the airplane in order to release the flight mode of the mobile terminal.

The mobile terminal 100 may receive the location information at a certain period using the GPS 300 and the base station 270. The mobile terminal 100 is informed about the user's current location each time it receives the location information by comparing the 'Condition A' information to the received information. As illustrated in FIG. 5, it is assumed that the mobile terminal 100 receives location information from the GPS 300 at a certain period (S10).

The mobile terminal 100 compares the received GPS location information to the previously stored geographic information related to an airport (S20). The comparison with the geographic information related to the airport, or information based on 'Condition A', need not performed if the GPS location information is sufficiently reliable.

Figure 7A:
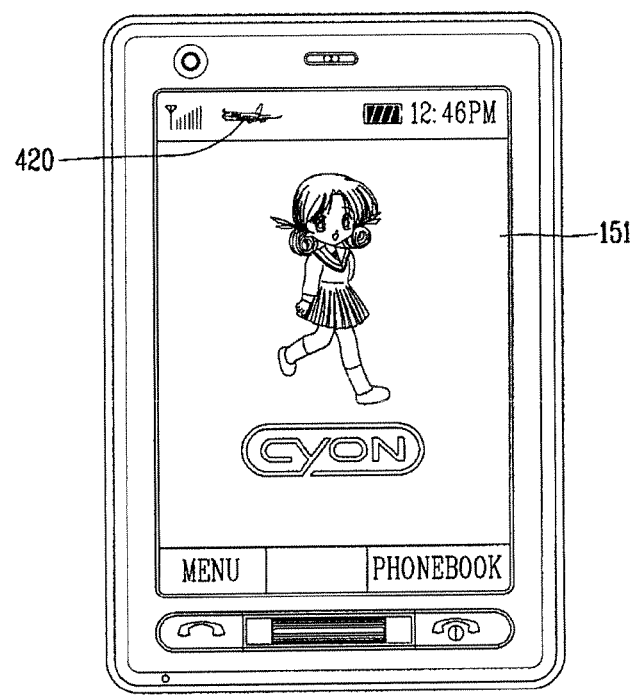
FIG. 7A illustrates a preliminary flight mode state of the mobile terminal according to the present invention using an indicator.

The controller 180 displays an indicator 420 in the shape of an airplane on the display 151 (S40), as illustrated in FIG. 7A, if the comparison indicates that the user enters an airport or is located near an airport (S30) in order to inform the user that the mobile terminal 100 should be switched to the flight mode. The present invention defines a step before switching to the flight mode as the 'flight mode setup preliminary state' or 'preliminary flight mode'. The user is informed that the mobile terminal 100 should be switched to the flight mode before boarding or just after boarding an airplane by the preliminary flight mode.

A specific effect is provided for the indicator 420 in order to distinguish the indicator in the preliminary flight mode from the indicator 420 in the flight mode. For example, a flickering airplane shaped indicator 420 may be displayed in the preliminary flight mode while an indicator without any separate effect is displayed in the flight mode.

Figure 7B:
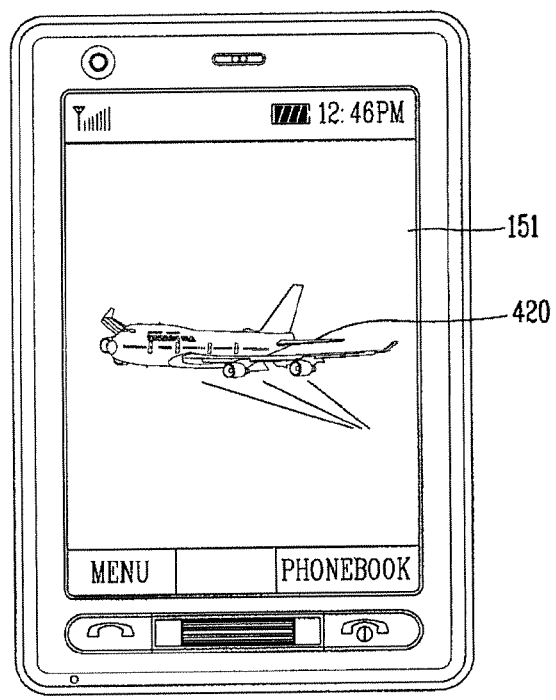
FIG. 7B illustrates the preliminary flight mode state illustrated in FIG. 7A using an indicator according to another embodiment.

FIG. 7B illustrates another embodiment using an indicator 420. As illustrated in FIG. 7B, the indicator 420 having the shape of an airplane is displayed on one side of the display 151 as a background screen (S40). Alternatively, an animation effect may be provided for the indicator 420 in order to attract the user's attention, such as an animation that the airplane shaped indicator flies across the screen.

Preferably, the mobile terminal 100 generates a vibration or a sound effect, such as an alarm sound, even when mobile terminal is in the user's pocket. It is contemplated that the controller 180 may display the preliminary flight mode using other methods as well as the indicator 420.

Figure 8:
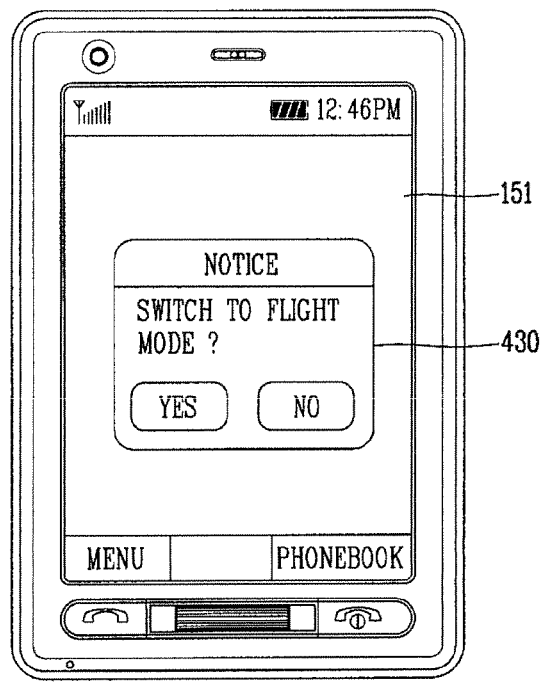
FIG. 8 illustrates the preliminary flight mode state of the mobile terminal according to the present invention using a pop-up window.

FIG. 8 illustrates a preliminary flight mode of a mobile terminal 100 using a pop-up window 430. As illustrated in FIG. 8, the controller 180 displays a pop-up window 430 in order to ask the user whether to switch the mobile terminal 100 to the flight mode (S40). The controller 180 switches the mobile terminal 100 to the flight mode or maintains the preliminary flight mode according to the user's selection of, respectively, 'Yes' or 'No'. Preferably, a vibration effect or sound, such as an alarm sound, is applied together with the pop-up window 430 in order to better attract the user's attention even when the mobile terminal 100 is in a user's pocket.

Figure 9:
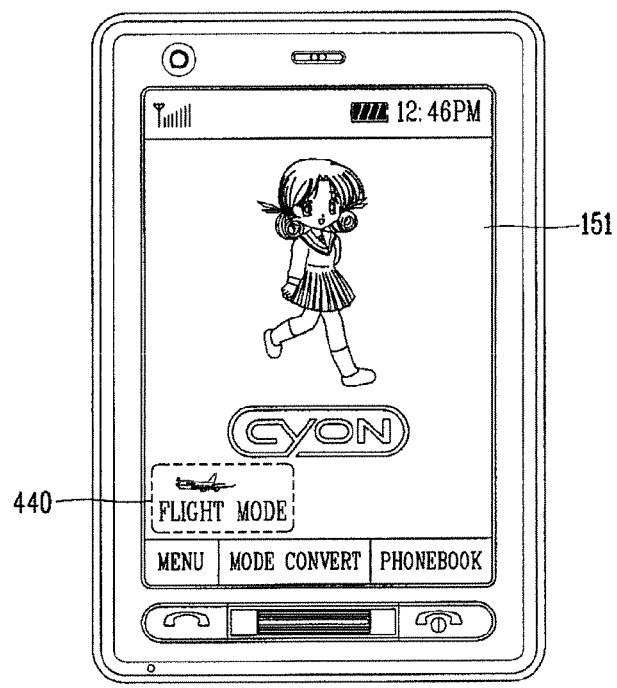
FIG. 9 illustrates the preliminary flight mode state of the mobile terminal according to the present invention using an icon.

FIG. 9 illustrates the preliminary flight mode of a mobile terminal 100 using an icon 440. As illustrated in FIG. 9, the controller 180 displays an icon 440 indicating that the mobile terminal 100 is currently in the preliminary flight mode (S40). The icon 440 can better attract the user's attention by utilizing various specific effects, such as flickering, a neon sign effect, blinking, or flashing.

The controller 180 may display a separate software button or hotkey when the mobile terminal 100 is switched to the preliminary flight mode in order to allow the user to switch the mobile terminal to the flight mode. The mobile terminal 100 is switched to the flight mode (S60) upon detecting activation of the software button (S50). The software button increases the user's convenience by switching the mobile terminal 100 to the flight mode via a one-time input or touching.

The icon 440 may be implemented as the software button. The mobile terminal 100 is switched to the flight mode (S50, S60) when the user selects or touches the icon 440. A vibration effect or sound, such as an alarm sound, can be applied together with the icon 440 in order to better attract the user's attention.

The controller 180 continues to output the preliminary flight mode according to any of the methods illustrated in FIGS. 7 to 9 even when no location information according to 'Condition A' is received from the base station 270 or the GPS

300. The preliminary flight mode is continuously displayed until terminated by the user or the mobile terminal 100 is switched to the flight mode.

The present invention contemplates that the user recognizes the preliminary flight mode and switches the mobile terminal 100 to the flight mode before or just after boarding an airplane. The controller 180 displays a message to ask whether the user wants to turn the mobile terminal 100 off or wants to switch the mobile terminal to the flight mode when the user inputs a power off command by pressing the 'END key' for a long time in the preliminary flight mode. The controller 180 performs the power off operation or the switch to the flight mode according to the user's response to the message.

The controller 180 can still execute functions usable in the flight mode, such as broadcast viewing, MP3 player, schedule managing, camera, and games, after the mobile terminal 100 is switched to the flight mode. However, communication functions including placing a call, sending messages, and accessing the wireless Internet that are not usable in the flight mode cannot be performed.

Figure 10:
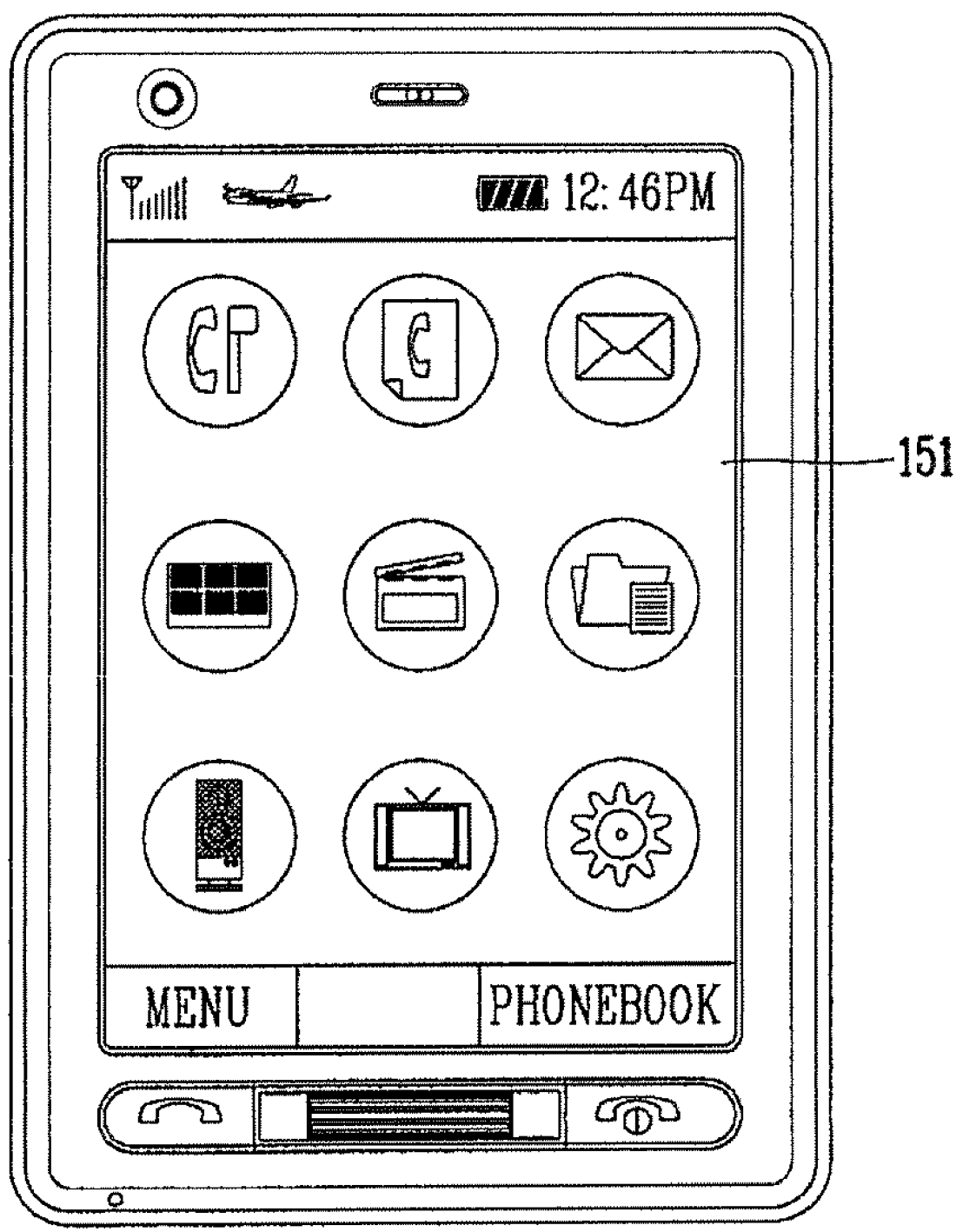
FIG. 10 illustrates an idle screen of a flight mode according to one embodiment of the present invention.

FIGS. 10 and 11 illustrate screens of a mobile terminal 100 in a flight mode. The controller 180 displays and arranges icons or operation buttons for executable functions on an idle screen of the mobile terminal 100, as illustrated in FIG. 10, when the mobile terminal is switched to the flight mode.

The controller 180 arranges the executable functions with high rates of use on the display 151 considering the limited size of the screen. The functions are arranged according rates at which the functions are used.

Alternatively, the controller 180 may change a menu screen or menu environment in order to distinguish between executable functions and non-executable functions. Preferably, the menu screen of the mobile terminal 100 is displayed such that executable functions are distinguished from non-executable functions in the flight mode, as illustrated in FIGS. 11A to 11D.

Figure 11A:
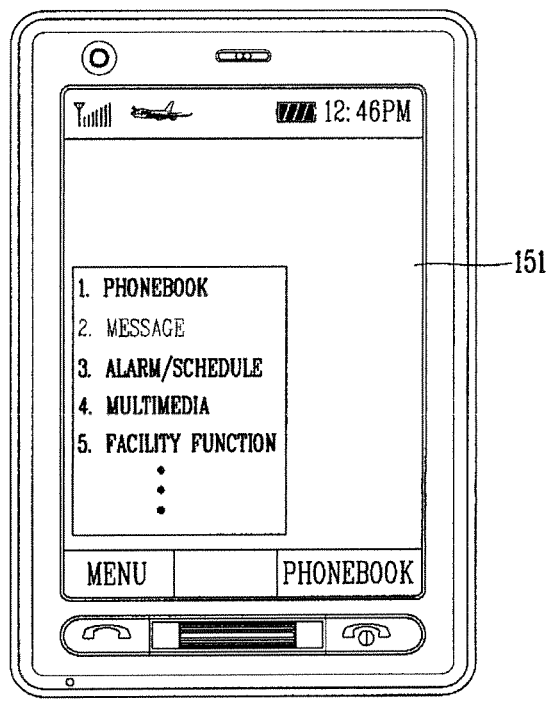
FIG. 11A illustrates a menu screen of a flight mode according to one embodiment of the present invention.

FIG. 11A illustrates a menu screen displaying a non-executable 'MESSAGE' function that is deactivated in the flight mode. The controller 180 may display '2. MESSAGE' with dotted letters or with low brightness such that it may be distinguished from other menu items, such as '1. PHONE-BOOK', '3. ALARM/SCHEDULE', '4. MULTIMEDIA' and '5. FACILITY FUNCTION'.

As illustrated in FIG. 11A, the menu item '2. MESSAGE' is displayed with lower brightness than the other menu items to indicate that the function is non-executable. A message is output to indicate that the selected menu is not executable if the user selects '2. MESSAGE'.

The menu screen can also be implemented such that the user cannot select a non-executable menu item, such as '2. MESSAGE'. For example, a cursor may be inhibited from moving to a non-executable menu item by making the cursor skip the menu item.

Figure 11B:
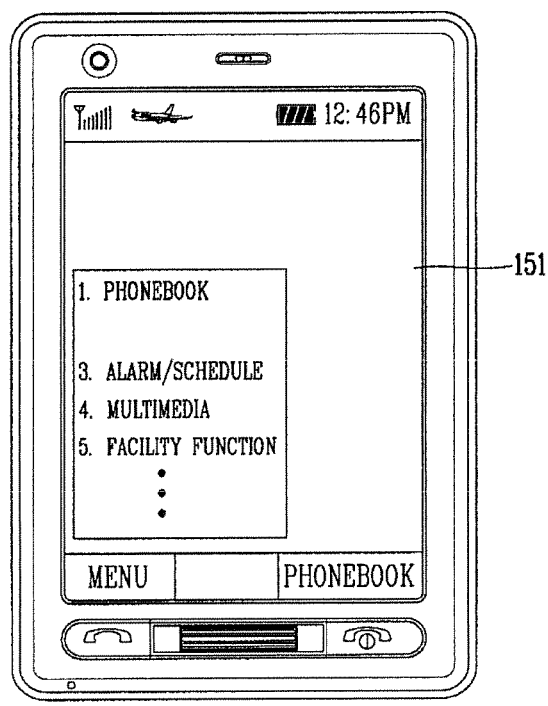
FIG. 11B illustrates a menu screen of a flight mode according to another embodiment of the present invention.

As illustrated in FIG. 11B, the non-executable function '2. MESSAGE' is left blank. Therefore, the user cannot select '2. MESSAGE'.

Figure 11C:
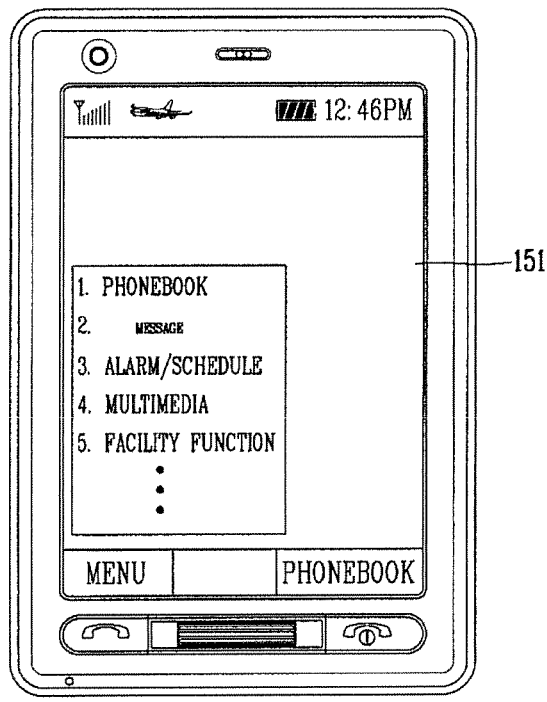
FIG. 11C illustrates a menu screen of a flight mode according to another embodiment of the present invention.

As illustrated in FIG. 11C, a different font size is used to display the non-executable '2. MESSAGE' function. The controller 180 controls the font size of the displayed '2. MESSAGE' such that it is smaller than the font of other menu items. The controller 180 may also display '2. MESSAGE' with a different font color or font type. An alarm sound may be output without executing the selected menu item if the user selects '2. MESSAGE'.

Figure 11D:
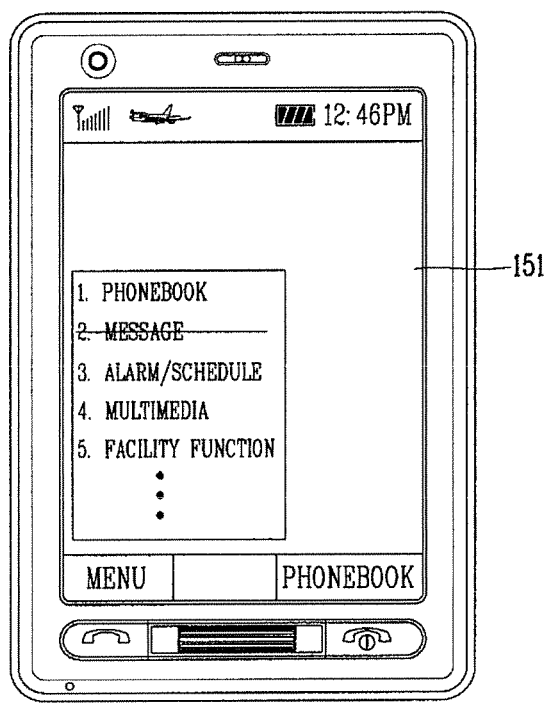
FIG. 11D illustrates a menu screen of a flight mode according to another embodiment of the present invention.

As illustrated in FIG. 11D, a canceling line is used to display the non-executable function '2. MESSAGE'. A message or alarm sound may be output to indicate that the selected function is not executable if the user selects '2. MESSAGE'. The controller 180 may also generate a vibration to warn or notify the user that the selected function is not executable.

In another embodiment of the present invention unlike the embodiments illustrated in FIGS. 11A to 11D, a menu screen displays both executable functions and non-executable functions without distinguishing them. The controller 180 outputs a message requiring release of the flight mode when the user selects a function, such as a communication function, that is not executable in the flight mode. The controller 180 controls the communication function such that it cannot to be executed unless the flight mode is released.

Figure 12:
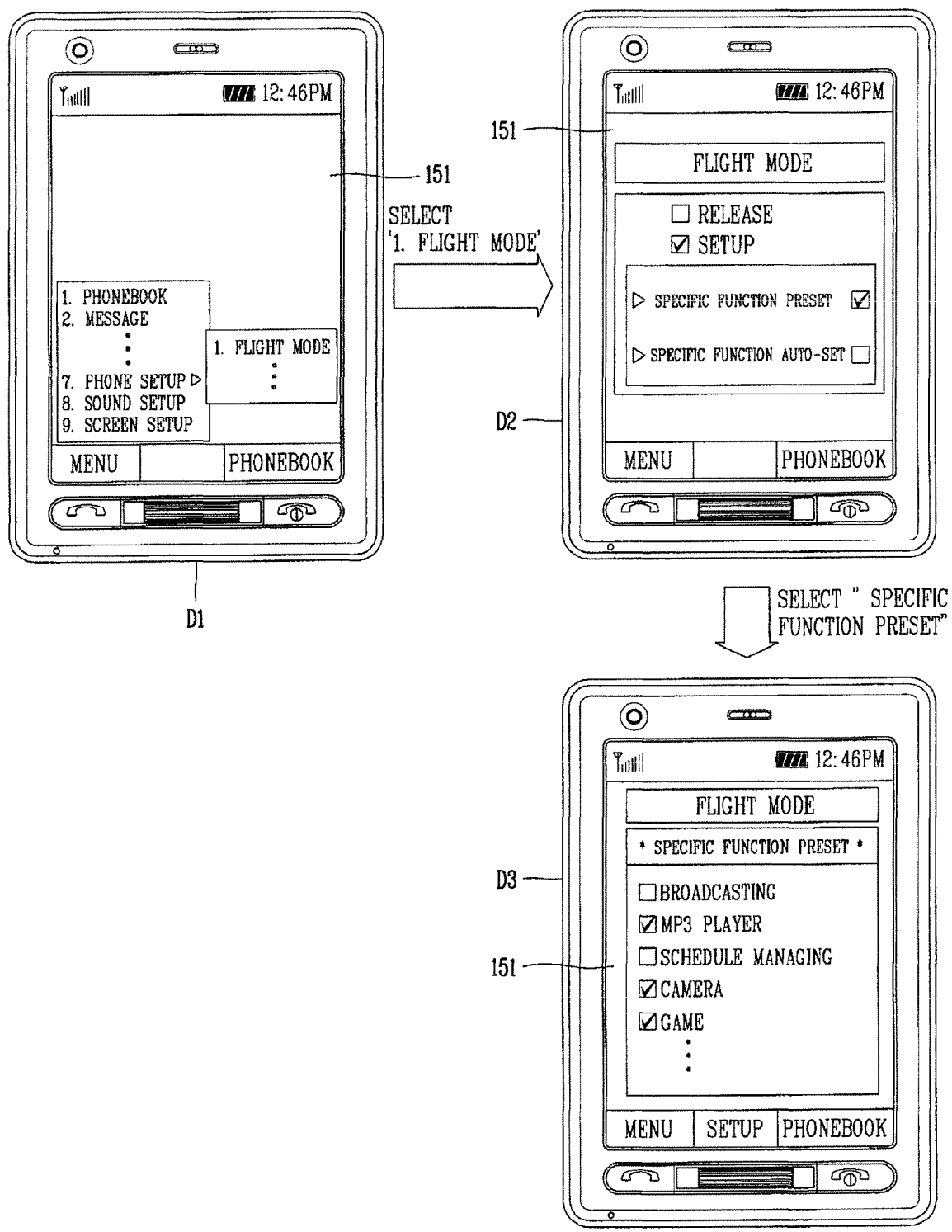
FIG. 12 illustrates a method for presetting functions to be used in a flight mode according to an embodiment of the present invention.

The present invention may also allow the user to pre-set functions for use in the flight mode. FIG. 12 illustrates a method for pre-setting functions for use in the flight mode.

As illustrated in FIG. 12, the controller 180 displays a setup menu screen for a corresponding function (D2) when the user selects a setup menu (D1) in the standby mode of the mobile terminal 100. The controller 180 displays functions that are executable in the flight mode (D3) when the user selects 'SPECIFIC FUNCTION PRESET' from the setup menu screen (D2). The user can then select functions for use in the flight mode from the displayed functions.

The controller 180 arranges the selected functions on the display 151, as illustrated in FIG. 10, or displays the selected functions in an activated state, as illustrated in FIG. 11. The user may set the 'SPECIFIC FUNCTION PRESET' function either in the standby state of the mobile terminal 100 or when switching the mobile terminal to the flight mode.

Figure 13:
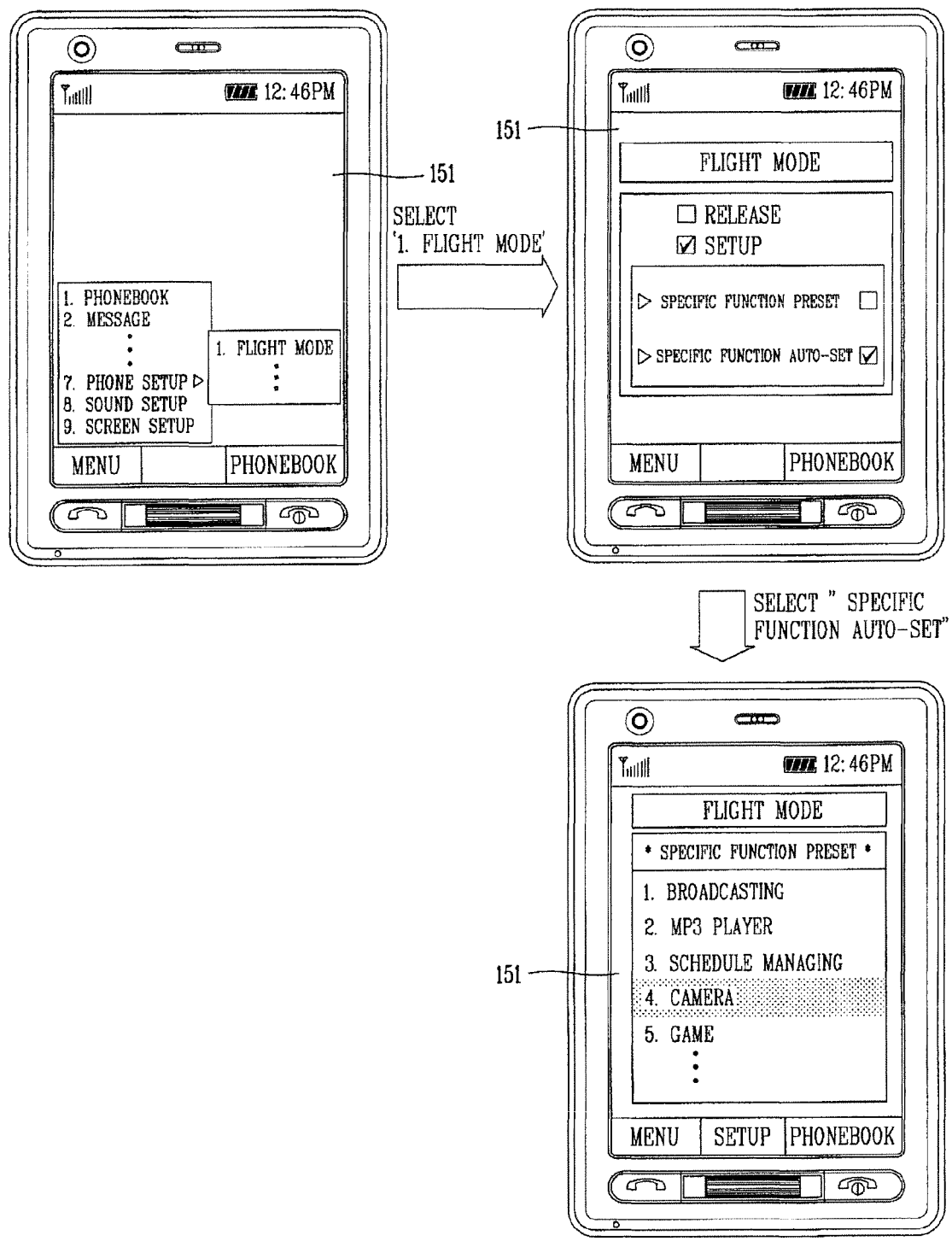
FIG. 13 illustrates a method for setting automatic execution of specific functions in a flight mode according to an embodiment of the present invention.

The present invention also facilitates automatically executing a specific function when the mobile terminal 100 is switched to the flight mode. FIG. 13 illustrates a method for setting the automatic execution of a specific function.

The controller 180 displays functions executable in the flight mode when the user selects 'SPECIFIC FUNCTION AUTO-SET' from the setup menu screen (D2) in FIG. 12. The controller 180 then automatically executes a function selected by the user from the functions displayed on the setup screen (D2) in FIG. 12 when the mobile terminal 100 is switched to the flight mode.

The present invention also facilitates automatically sending previously composed messages when the flight mode is released. The controller 180 displays and executes a text message edit window that allows the user to write a message in the flight mode when the user inputs a request for composing a text message. The user then inputs contents of a message to send and a phone number or a mail address of a receiving party similar to a general text message transmitting process.

The controller 180 stores the message in the memory 160 when the user inputs a final transmission command, such as 'SEND'. The stored message is sent to the receiving party after a certain time elapses, the flight mode is released and the communication function of the mobile terminal is operated normally.

The controller 180 also displays a message asking whether to maintain the flight mode or return to a general mode when the mobile terminal 100 is powered off and then powered on again in the flight mode. The controller 180 either maintains the mobile terminal 100 in the flight mode or switches the mobile terminal to a general mode according to the user's response to the message.

Figure 14:
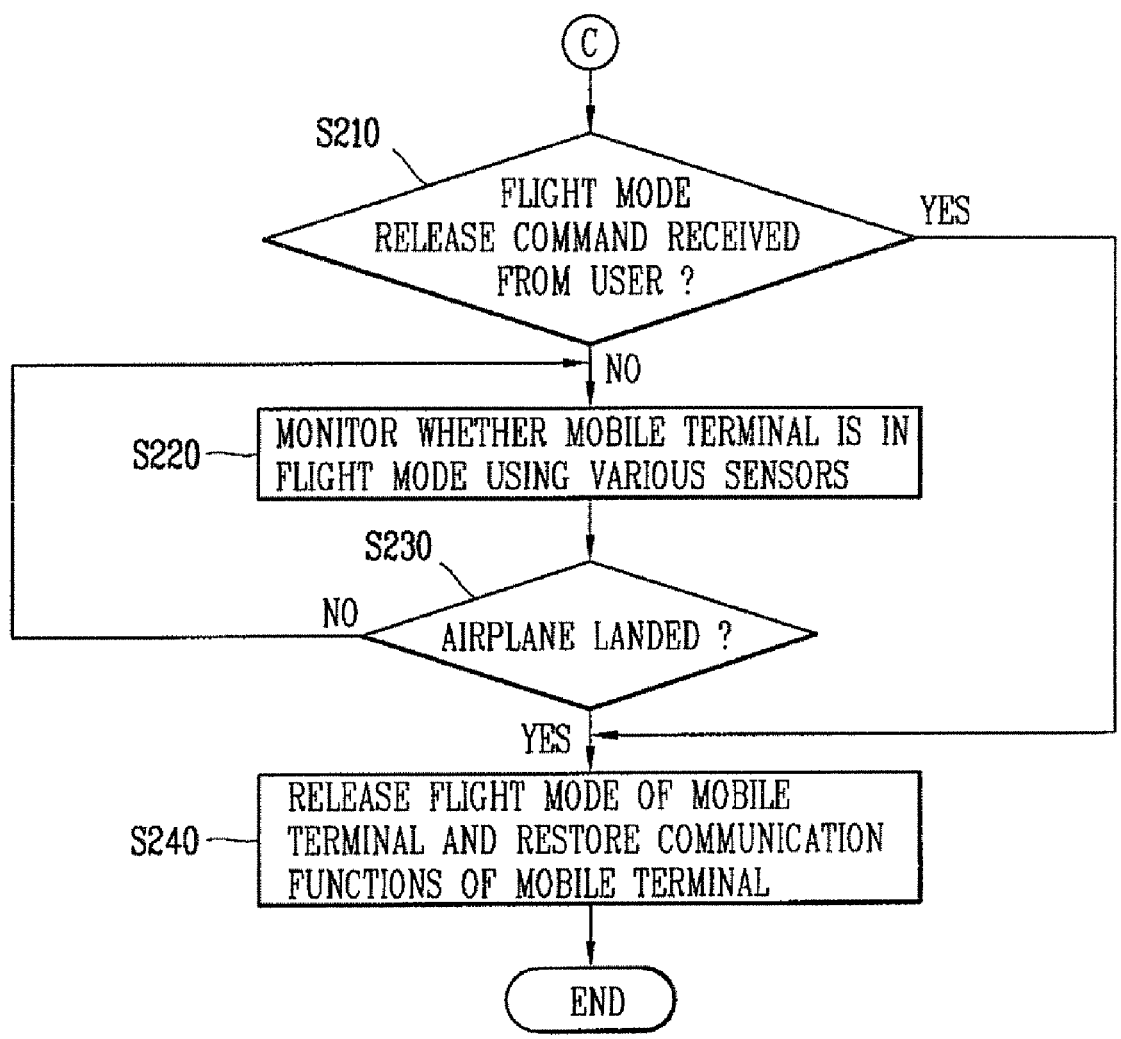
FIG. 14 is a flowchart illustrating a method for releasing a flight mode according to an embodiment of the present invention.

FIG. 14 illustrates a flowchart of a method for releasing the flight mode in a mobile terminal 100 in one embodiment of the present invention. The present invention may include both a method for manually releasing the flight mode in response to a user's input, such as a flight mode release command, and a method for automatically releasing the flight mode using a sensor.

The mobile terminal 100 utilizes the sensing unit 140 to sense an altitude and a velocity of an airplane for automatic release of the flight mode. The sensing unit 140 may include an altitude sensor for sensing altitude and outputting altitude information and a velocity sensor for sensing velocity and outputting velocity information.

The controller 180 monitors an input value from the user input unit 130 after the mobile terminal 100 is switched to the flight mode in order to determine if a user has input a flight mode release command (S210). The controller 180 then releases the flight mode upon detecting the flight mode release command and restores or reactivates the mobile terminal communication function (S240).

The controller 180 also operates both the altitude sensor and the velocity sensor after the mobile terminal 100 is switched to the flight mode in order to monitor changes in output values from the two sensors (S220). The flight mode is released when the velocity sensor outputs a zero value and the altitude sensor outputs a value lower than a threshold that is a condition for releasing the flight mode.

The threshold value of the altitude sensor for releasing the flight mode may be set differently for different airports located at different altitudes. The controller 180 refers to previously stored airport related geographic information in order to output the corresponding threshold value for each airport.

The controller 180 releases the flight mode of the mobile terminal 100 and restores the mobile terminal communication function (S240) upon determining that the airplane has landed (S230), specifically when the output values from the velocity sensor and the altitude sensor satisfy the condition for releasing the flight mode.

Figure 15:
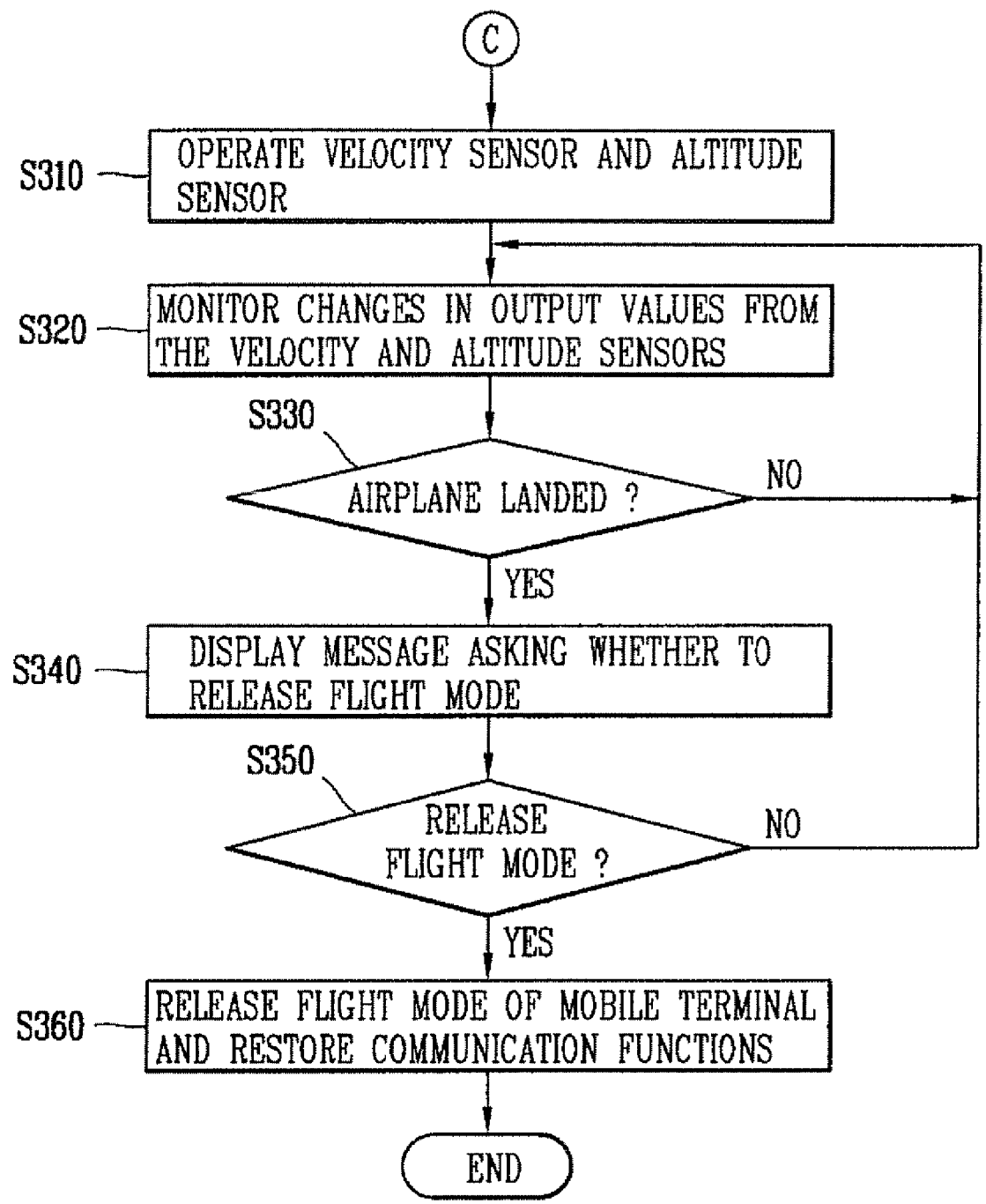
FIG. 15 is a flowchart illustrating a method for releasing a flight mode according to another embodiment of the present invention.

FIG. 15 illustrates another embodiment of a method for automatically releasing the flight mode of a mobile terminal 100. As illustrated in FIG. 15, the controller 180 operates both the altitude sensor and the velocity sensor (S310) and monitors changes in the output values from the two sensors (S320) after the mobile terminal 100 is switched to the flight mode. The conditions for releasing the flight mode and the threshold value of the altitude sensor are the same as those in the embodiment illustrated in FIG. 14.

The controller 180 displays a message requesting to release the flight mode (S340) upon determining that the airplane has landed, specifically when the output values from the velocity sensor and the altitude sensor satisfy the conditions for releasing the flight mode (S330). The flight mode of the mobile terminal 100 is released and the mobile terminal communication function is restored (S360) when the user inputs a flight mode release command (S350).

The displayed message (S340) may guide the user in various ways to release the flight mode. The indicator 420, pop-up window 430, or icon 440 previously disclosed for displaying the preliminary flight mode of the mobile terminal 100 may be utilized to indicate to the user that the flight mode should be released. This step is referred to as 'preliminary flight mode release'.

The methods for setting and releasing the flight mode according to each embodiment of the present invention may be implemented as computer-readable codes in a program-recorded medium. The computer-readable media may include all types of recording devices each storing data readable by a computer system.

Examples of the computer-readable medium include ROM, RAM, CD-ROM, magnetic tape, floppy disk, and an optical data storage medium. The computer-readable medium may also be implemented as a format of carrier wave, such as transmission via an Internet. The computer may include the controller 180 of the mobile terminal 100.

The mobile terminal according to the present invention can detect time points when the flight mode should be set or released and inform a user. The mobile terminal according to the present invention also senses whether to set a flight mode and informs the user, thereby allowing the user to use the mobile terminal more conveniently. The mobile terminal according to the present invention also senses whether to release the flight mode and informs the user, thereby enhancing the convenience of using the mobile terminal. The mobile terminal according to the present invention also provides a user interface to facilitate distinguishing between executable functions and non-executable functions in a flight mode.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The methods described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention could be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of providing a user interface of a mobile terminal, comprising:
   permitting operation of the mobile terminal in a first mode, wherein during the first mode the mobile terminal is enabled to perform functions related to communication services and is enabled to perform functions related to non-communication services;
   switching the operation of the mobile terminal from the first mode to a flight mode responsive to first user input received at the mobile terminal, wherein during the flight mode the mobile terminal cannot perform the functions related to the communication services and is enabled to perform the functions related to non-communication services;
   displaying on a display of the mobile terminal, during a period of time of the flight mode, a menu screen that depicts the functions related to the communication services and depicts the functions related to the non-communication services;
   receiving second user input at the mobile terminal during a period of time of the flight mode, wherein the second user input represents a user request for performing a selected one of the functions related to the communication services or one of the functions related to the non-communication services; and
   displaying a message on the display when the second user input represents a user request for performing a communication function related to one of the communications services, wherein the message requests release of the flight mode in order to perform the communication function.

2. The method of claim 1, further comprising:
   releasing of the flight mode such that the mobile terminal is switched from the flight mode after the message is displayed, wherein third user input causes the releasing of the flight mode; and
   performing the communication function after the releasing of the flight mode.

3. The method of claim 1, wherein the menu screen depicts the functions related to the communication services in a manner that is not visually distinguishable from the depiction of the functions related to the non-communication services.

4. The method of claim 1, wherein the functions related to the communication services are related to at least one of placing calls, sending messages, receiving messages, or wireless Internet access.

5. The method of claim 1, further comprising:
   displaying a fight mode setup menu comprising a plurality of functions relating to the non-communication services; and
   permitting user selection of each of the plurality of functions of the flight mode set up menu, the user selection identifying whether a particular function of the plurality of functions of the flight mode setup menu is included in the functions related to the non-communication services and is able to be performed during the flight mode.

6. The method of claim 1, further comprising:
   executing a message editing function during a period of time of the flight mode;
   receiving third user input at the mobile terminal via the message editing function, wherein the third user input relates to a message to be communicated using a function of the communication services;
   releasing of the flight mode such that the mobile terminal is switched from the flight mode to the first mode; and
   automatically sending the message using a function of the communication services after the releasing of the flight mode.

7. The method of claim 1, further comprising:
   receiving user input at the power off key while the mobile terminal is in the first mode; and
   displaying a screen which presents options to either to turn the mobile terminal off or to switch from the first mode to the flight mode, wherein the displaying of the screen is responsive to receiving the user input at the power off key for a threshold amount of time.

8. The method of claim 1, further comprising:
coupling of the mobile terminal to an external device; and
providing audio data to the external device via the coupling.

9. The method of claim 1, further comprising:
during a period of time during the first mode, displaying a request on the display, wherein the request provides a user option to switch to the flight mode.

10. The method of claim 9, wherein the request is at least one of an indicator, icon, or pop-up window.

11. The method of claim 1, further comprising:
automatically switching operation of the mobile terminal from the flight mode to the first mode responsive to a condition related to a location of the mobile terminal.

12. A mobile terminal, comprising:
a wireless communication unit configured to permit two-way communications between the mobile terminal and a communication network;
a touchscreen display configured to receive user touch input;
a memory configured to data; and
a controller configured to:
permit operation of the mobile terminal in a first mode, wherein during the first mode the mobile terminal is enabled to perform functions related to communication services and is enabled to perform functions related to non-communication services;
switch the operation of the mobile terminal from the first mode to a flight mode responsive to first user input received at the touchscreen display, wherein during the flight mode the mobile terminal cannot perform the functions related to the communication services and is enabled to perform the functions related to non-communication services;
cause displaying on the touchscreen display during a period of time of the flight mode, a menu screen that depicts the functions related to the communication services and depicts the functions related to the non-communication services;
receive second user input via the touchscreen display during a period of time of the flight mode, wherein the second user input represents a user request for performing a selected one of the functions related to the communication services or one of the functions related to the non-communication services; and
cause displaying of a message on the touchscreen display when the second user input represents a user request for performing a communication function related to one of the communications services, wherein the message requests release of the flight mode in order to perform the communication function.

13. The mobile terminal of claim 12, wherein the controller is further configured to:
release the flight mode such that the mobile terminal is switched from the flight mode after the message is displayed, wherein third user input causes the releasing of the flight mode; and
perform the communication function after the releasing of the flight mode.

14. The mobile terminal of claim 12, wherein the menu screen depicts the functions related to the communication services in a manner that is not visually distinguishable from the depiction of the functions related to the non-communication services.

15. The mobile terminal of claim 12, wherein the controller is further configured to:
cause displaying on the touchscreen display of a fight mode setup menu comprising a plurality of functions relating to the non-communication services; and
permit user selection of each of the plurality of functions of the flight mode set up menu, the user selection identifying whether a particular function of the plurality of functions of the flight mode setup menu is included in the functions related to the non-communication services and is able to be performed during the flight mode.

16. The mobile terminal of claim 12, wherein the controller is further configured to:
execute a message editing function during a period of time of the flight mode;
receive third user input at the mobile terminal via the message editing function, wherein the third user input relates to a message to be communicated using a function of the communication services;
release the flight mode such that the mobile terminal is switched from the flight mode to the first mode; and
automatically send the message using a function of the communication services after the releasing of the flight mode.

17. The mobile terminal of claim 12, wherein the controller is further configured to:
receive user input at the power off key while the mobile terminal is in the first mode; and
cause displaying of a screen which presents options to either to turn the mobile terminal off or to switch from the first mode to the flight mode, wherein the displaying of the screen is responsive to receiving the user input at the power off key for a threshold amount of time.

18. The mobile terminal of claim 12, wherein the controller is further configured to:
automatically switch operation of the mobile terminal from the flight mode to the first mode responsive to a condition related to a location of the mobile terminal.

* * * * *